(12) United States Patent
Schaddenhorst et al.

(10) Patent No.: US 6,702,960 B1
(45) Date of Patent: Mar. 9, 2004

(54) CATALYTIC PARTIAL OXIDATION WITH A RHODIUM-IRIDIUM ALLOY CATALYST

(75) Inventors: David Schaddenhorst, CM Amsterdam (NL); Ronald Jan Schoonebeek, CM Amsterdam (NL)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 09/720,294

(22) PCT Filed: Jun. 24, 1999

(86) PCT No.: PCT/EP99/04408

§ 371 (c)(1),
(2), (4) Date: Dec. 22, 2000

(87) PCT Pub. No.: WO00/00426

PCT Pub. Date: Jan. 6, 2000

(30) Foreign Application Priority Data

Jun. 30, 1998 (EP) ............................................. 98305179

(51) Int. Cl.⁷ .............................. C07C 1/02; C01B 3/24; C01B 3/26; B01J 23/46
(52) U.S. Cl. ........................ 252/373; 423/650; 423/651; 502/325; 502/326; 502/327

(58) Field of Search .................. 252/373; 423/650, 423/651; 502/325, 326, 327

(56) References Cited

U.S. PATENT DOCUMENTS 5,658,497 A * 8/1997 Kumar et al. ............... 252/373
5,883,138 A * 3/1999 Hershkowitz et al. ...... 518/703

FOREIGN PATENT DOCUMENTS

| CN | 1089232 | 7/1994 | |
|----|---------|--------|---|
| DE | 4102185 A1 | * 1/1991 | C01B/3/40 |
| EP | 0629578 A1 | * 12/1994 | C01B/3/40 |
| GB | 2274284 A | * 7/1994 | C01B/3/38 |

* cited by examiner

Primary Examiner—Stanley S. Silverman
Assistant Examiner—Jonas N. Strickland

(57) ABSTRACT

The present invention relates to a process for the catalytic partial oxidation of a hydrocarbonaceous feedstock, which process consists of contacting a feed consisting of the hydrocarbonaceous feedstock and an oxygen-containing gas with a catalyst having metals of Group VIII of the Periodic Table of Elements, wherein the Group VIII metals are at least rhodium and iridium in intimate association with each other.

15 Claims, 1 Drawing Sheet

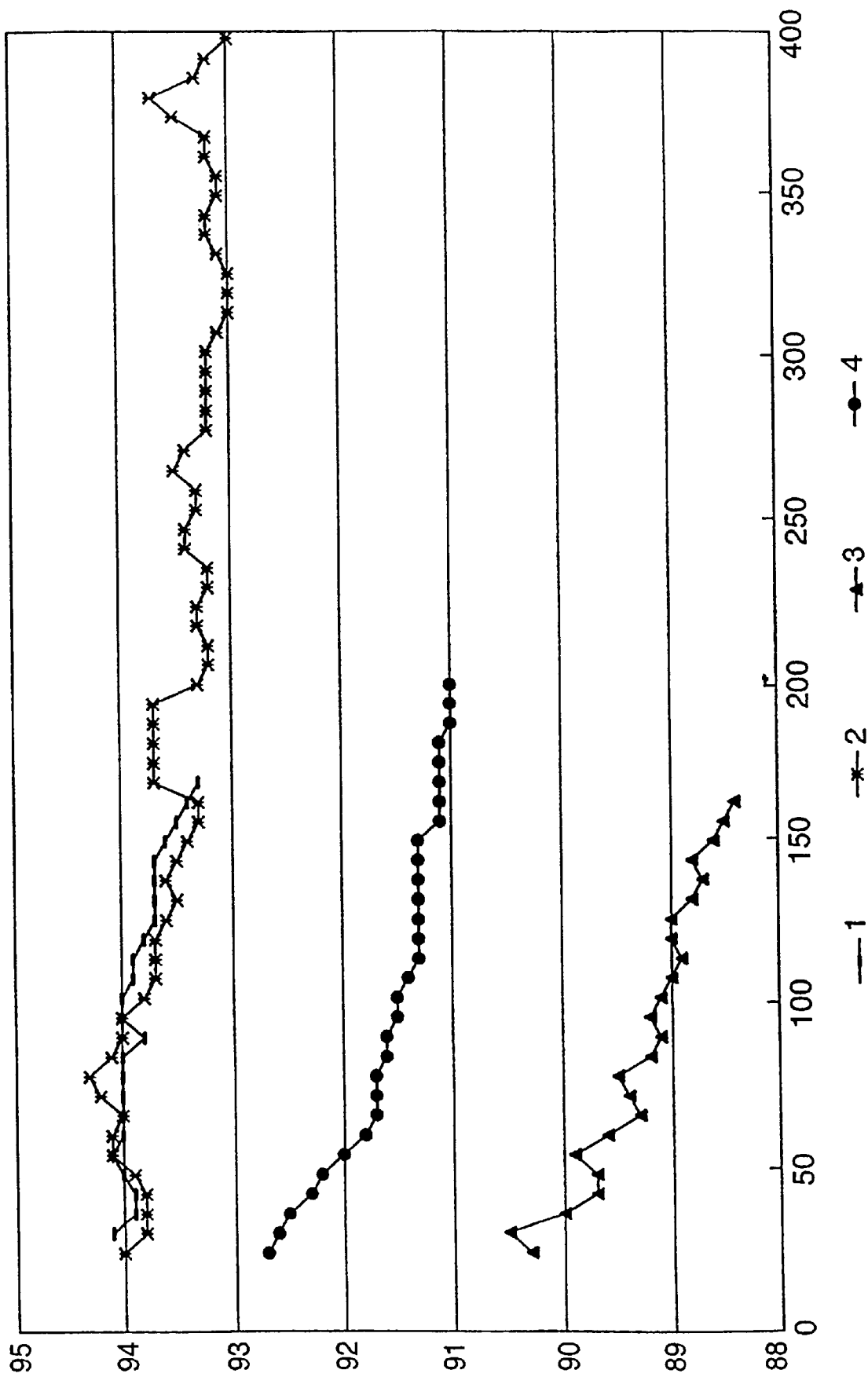

CATALYTIC PARTIAL OXIDATION WITH A RHODIUM-IRIDIUM ALLOY CATALYST

FIELD OF THE INVENTION

The present invention relates to a process for the catalytic partial oxidation of a hydrocarbonaceous feedstock.

BACKGROUND OF THE INVENTION

The partial oxidation of hydrocarbons, for example methane or natural gas, in the presence of a catalyst is an attractive route for the preparation of mixtures of carbon monoxide and hydrogen, known in the art as synthesis gas. The partial oxidation of a hydrocarbon is an exothermic reaction and, in the case in which methane is the hydrocarbon, proceeds by the following reaction:

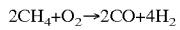

A mixture of carbon monoxide and hydrogen prepared by this process is particularly suitable for use in the synthesis of hydrocarbons, for example by means of the Fisher-Tropsch synthesis, or the synthesis of oxygenates, for example methanol. Processes for the conversion of the mixture of carbon monoxide and hydrogen into such products are well known in the art.

Hydrogen, or a mixture of hydrogen with other gases prepared by this process may be particularly suitable for use as a combustible fuel either directly or indirectly.

The catalytic partial oxidation process could very suitably be used to provide the hydrogen feed for a fuel cell. In fuel cells, hydrogen and oxygen are passed over the fuel cell in order to produce electricity and water. Fuel cell technology is well known in the art.

In order to obtain high yields of carbon monoxide and hydrogen, it is for thermodynamic reasons preferred to operate the partial oxidation process at relatively high temperatures.

The literature contains a number of documents disclosing details of experiments relating to the catalytic oxidation of hydrocarbons, in particular methane, employing a wide range of catalysts. Reference is made for instance to U.S. Pat. No. 5,149,464 and WO 92/11199.

To be commercially attractive, a catalytic partial oxidation process should be able to operate at relatively severe conditions, i.e. the combination of high temperature and high gas hourly space velocity. An important factor when considering a catalyst for application in a commercial process, is the stability of that catalyst under the prevailing process conditions.

EP-A-0 629 578 discloses that, at a temperature of at least 950° C. and at a very high gas hourly space velocity, a marked difference in the stability of the Group VIII metal catalysts exists. It has been found that catalysts comprising rhodium, iridium or ruthenium display a significantly higher stability in terms of both selectivity and activity than the remaining Group VIII metal catalysts.

U.S. Pat. No. 5,648,582 concerns a catalytic partial oxidation process at very high gas hourly space velocity and at a catalyst temperature in the range of from 850 to 1150° C. using a catalyst comprising rhodium, nickel or platinum.

In WO 95/18063, it is disclosed that partial oxidation catalysts comprising rhodium, iridium or platinum as the catalytically-active metal, generate significantly lower amounts of ammonia and hydrogen cyanide than catalysts comprising other catalytically-active metals.

In GB-A-2 274 284, a catalytic partial oxidation process is described using a catalyst arranged as a cascade of a plurality of catalytic beds, wherein the first and most upstream bed comprises rhodium in combination with platinum or palladium and the second bed comprises rhodium and iridium.

SUMMARY OF THE INVENTION

There still exists a problem in the art in that catalysts comprising either rhodium or iridium in their upstream layer slowly deactivate under the severe process conditions required for commercial operation to produce mixtures of carbon monoxide and hydrogen.

DETAILED DESCRIPTION OF THE INVENTION

Surprisingly, it has now been found that the stability of a catalytic partial oxidation catalyst can be improved by using rhodium and iridium in intimate association with each other as the catalytically active material in the upstream layer of the catalyst.

Accordingly, the present invention relates to a process for the catalytic partial oxidation of a hydrocarbonaceous feedstock, which process comprises contacting a feed comprising the hydrocarbonaceous feedstock and an oxygen-containing gas with a catalyst, wherein the total feed is contacted with the upstream layer of the catalyst and the upstream layer of the catalyst comprises rhodium and iridium in intimate association with each other.

Reference herein to intimate association of the rhodium with the iridium, is to its incorporation in suitable manner on or with the iridium thereby modifying the catalytic performance properties of each other. Rhodium and iridium are essentially present as an intimate admixture or as layers which resemble an admixture, thereby affecting the stability and/or catalytic performance of each other. Essentially present as an admixture means that at least 50%, preferably at least 90%, of the iridium and rhodium is present within a distance of 10 $\mu$m of the other metal, preferably within a, distance of 5 $\mu$m. Preferably, the admixture is a rhodium-iridium alloy. The presence of an alloy can be determined by methods known in the art, for example by XRD.

The catalyst may comprise rhodium and iridium in the form of wires or gauzes of a rhodium-iridium alloy. Preferably, the catalyst comprises rhodium and iridium supported on a catalyst carrier material. Suitable catalyst carrier materials are well known in the art and include refractory oxides, such as silica, alumina, titania, zirconia and mixtures thereof, and metals. High-alloy, alumina-containing steel, such as fecralloy-type materials are particularly suitable metals. Preferred refractory oxides are zirconia-based, more preferably comprising at least 70% by weight zirconia, for example selected from known forms of (partially) stabilised zirconia or substantially pure zirconia. Most preferred zirconia-based materials comprise zirconia stabilised or partially-stabilised by one or more oxides of Mg, Ca, Al, Y, La or Ce. Most suitable carrier materials are Ce-ZTA (zirconia-toughened alumina) and Y-PSZ (partially-stabilised zirconia), both commercially available.

In the case that rhodium and iridium are supported on a catalyst carrier material as hereinbefore defined, a suitable method for associating rhodium and iridium is impregnation. Preferably, the carrier is impregnated with a solution of a rhodium compound and a solution of an iridium compound, followed by drying and, optionally, calcining the resulting material. The solutions are preferably combined in a suitable amount and co-impregnated. Alternatively, impregnation may be sequential, with a first stage impregnation with an iridium solution and a second stage impregnation with a rhodium solution or in a reverse order.

The catalyst comprises rhodium and iridium in any suitable amount to achieve the required level of activity. Typically, the catalyst comprises rhodium and iridium in a total concentration in the range of from 0.02 to 10% by weight, more preferably from 0.1 to 7.5% by weight based on the weight of the carrier material. Preferably, the rhodium-to-iridium weight ratio is in the range of from 0.1 to 10, more preferably in the range of from 0.2 to 5, even more preferably in the range of from 0.5 to 2.

The rhodium and iridium may be associated with at least one inorganic metal cation in such a way that the inorganic metal cation is present in intimate association, supported on or with the rhodium and iridium as described in International patent application PCT/EP99/00324.

The cation is selected from Groups IIA, IIIA, IIIB, IVA and IVB of the Periodic Table and the lanthanides, for example Al, Mg, Zr, Ti, La, Hf, Si and Ba, of which Zr is preferred. The cation is preferably in the form of its oxide.

Reference herein to intimate association of the cation is to its incorporation in suitable manner on or with the rhodium and iridium, thereby modifying the catalytic performance properties thereof.

Suitably therefore, the intimate association of cation and rhodium/iridium is present at the surface of the catalyst. Preferably, the catalyst comprises cation to metal in a ratio in excess of or equal to 1.0 at its surface, more preferably in excess of or equal to 2.0, even more preferably in excess of or equal to 3.0 up to a maximum only limited by the constraints of the method for constructing the catalyst, e.g. impregnation.

The rhodium and iridium is essentially present as an intimate admixture with the metal cation or as layers which resemble an admixture. Preferably, the admixture is present substantially as a single layer or as separate clusters. The admixture may be present throughout the catalyst bed or may be present only in certain regions of the catalyst bed, for example in the leading edge of a fixed bed.

The thickness of a layer of metal cation as hereinbefore defined may be selected for optimum effect and may be determined by measurement of the selectivity of reaction and the like. Thickness is conveniently in the order of microns.

The catalyst used in the process of the present invention may be in any form, preferably in the form of a fixed arrangement which is permeable to a fluid, especially to gas. The fixed arrangement suitably has a void fraction in the range of from 0.4 to 0.95, preferably in the range of from 0.6 to 0.9. The fixed arrangement may have any shape. Suitably, the downstream end of the fixed arrangement is co-planar with the upstream end.

Examples of suitable fixed arrangements are a fixed bed of catalyst particles, a porous monolithic structure such as a honeycomb or a foam, an arrangement of metal wire or gauze, or combinations thereof. Preferred fixed arrangements are ceramic foams. Suitable ceramic foams are commercially available, for example from Selee Inc., Hi-Tech, and Dytech. Preferred ceramic foams have a number of pores per cm in the range of from 10 to 120, more preferably in the range of from 20 to 80.

In the process of the present invention, the hydrocarbonaceous feedstock is in the gaseous phase when contacting the catalyst. The feedstock may contain compounds that are liquid and/or compounds that are gaseous under standard conditions of temperature and pressure (i.e. at 0° C. and 1 atm.)

The process is particularly suitable for the partial oxidation of methane, natural gas, associated gas or other sources of light hydrocarbons. In this respect, the term "light hydrocarbons" is a reference to hydrocarbons having from 1 to 5 carbon atoms. The process may be advantageously applied in the conversion of gas from naturally occurring reserves of methane which contain substantial amounts of carbon dioxide. The feed preferably comprises methane in an amount of at least 50% by volume, more preferably at least 70% by volume, especially at least 80% by volume.

The process is also suitable for the conversion of feedstocks being gaseous when contacting the catalyst during operation, but being liquid under standard conditions of temperature and pressure. Typically, these feedstocks have an average carbon number of at least 6 and contain up to 25 carbon atoms in their molecules. Examples of such feedstocks are hydrocarbons boiling in the range of from 50° C. to 500° C., preferably in the range of from 60° C. to 350° C. The process is particular suitable for the partial oxidation of naphtha feedstocks boiling between 35 and 150° C., kerosene feedstocks boiling between 150° C. and 200° C., or synthetic gas oil feedstocks boiling between 200° C. and 500° C., in particular between 200° C. and 300° C.

It is possible to have hydrocarbonaceous material present in the feedstocks which is gaseous under standard conditions of temperature and pressure, together with material which is liquid under standard conditions of temperature and pressure and having an average carbon number of at least 6.

The process according to the present invention can also be carried out when the feedstock contains oxygenates (being gaseous, and having less than 6 carbon atoms, and/or being liquid under standard condition of temperature and pressure and having an average carbon number of at least 6). Oxygenates to be used as (part of) the feedstock in the process according to the present invention are defined as molecules containing apart from carbon and hydrogen atoms at least 1 oxygen atom which is linked to either one or two carbon atoms or to a carbon atom and a hydrogen atom. Examples of suitable oxygenates comprise methanol, ethanol, dimethyl ether and the like.

Also mixtures of hydrocarbons and oxygenates as defined hereinbefore can be used as feedstock in the process according to the present invention.

The hydrocarbonaceous feedstock is contacted with the catalyst as a mixture with an oxygen-containing gas. Suitable oxygen-containing gases are air, oxygen-enriched air or pure oxygen. The feed mixture may optionally comprise steam. Optionally, the feed mixture may comprise carbon dioxide in a concentration of up to 60% by volume of the total feed mixture, especially 0.1–40% by volume.

The hydrocarbonaceous feedstock and the oxygen-containing gas are preferably present in the feed in such amounts as to give an oxygen-to-carbon ratio in the range of from 0.3 to 0.8, more preferably, in the range of from 0.45 to 0.75. References herein to the oxygen-to-carbon ratio refer to the ratio of oxygen in the form of molecules ($O_2$) to carbon atoms present in the hydrocarbon feedstock. Oxygen-to-carbon ratios in the region of the stoichiometric ratio of 0.5, i.e. ratios in the range of from 0.45 to 0.65, are especially preferred. If oxygenate feedstocks are used, e.g. methanol, oxygen-to-carbon ratios below 0.3 can suitably be used. If steam is present in the feed, the steam-to-carbon ratio is preferably in the range of from above 0.0 to 3.0, more preferably from 0.0 to 2.0. The hydrocarbonaceous feedstock, the oxygen-containing gas and steam, if present, are preferably well mixed prior to being contacted with the catalyst. The feed mixture is preferably preheated prior to contacting the catalyst.

The feed is preferably contacted with the catalyst under adiabatic conditions. For the purposes of this specification, the term "adiabatic" is a reference to reaction conditions under which substantially all heat loss and radiation from the reaction zone are prevented, with the exception of heat leaving in the gaseous effluent stream of the reactor. A substantial prevention of all heat losses, means that heat losses are at most 5% of the net calorific value of the feed mixture, preferably at most 1% of the net calorific value.

The optimum pressure, temperature and gas hourly space velocity may vary with the scale and the purpose of the catalytic partial oxidation process. In general, more severe conditions, i.e. higher pressure, temperature and space velocity, are applied for large-scale, commercial production of synthesis gas, for example for use in Fischer-Tropsch hydrocarbon synthesis or for methanol synthesis, than for smaller scale applications, such as the provision of hydrogen for fuel cells.

The process of the present invention may be operated at any suitable pressure. For applications on a large scale, elevated pressures, that is pressures significantly above atmospheric pressure are most suitably applied. The process is preferably operated at pressures in the range of from 1 to 150 bara. More preferably, the process is operated at pressures in the range of from 2 to 100 bara, especially from 5 to 50 bara.

In the process of the present invention, the feed is preferably contacted with the catalyst at a temperature in the range of from 750 to 1400° C. Reference herein to temperature is to the temperature of the gas leaving the catalyst. Under the preferred conditions of high pressure prevailing in processes operated on a large scale, the feed is preferably contacted with the catalyst at a temperature in the range of from 850 to 1350° C., more preferably of from 900 to 1300° C.

The feed may be provided during the operation of the process at any suitable space velocity. It is an advantage of the process of the present invention that very high gas space velocities can be achieved. Thus, gas space velocities for the process (expressed in normal litres of gas per kilogram of catalyst per hour, wherein normal litres refers to litres under STP conditions, i.e. 0° C. and 1 atm.) are preferably in the range of from 20,000 to 100,000,000 Nl/kg/h, more preferably in the range of from 50,000 to 50,000,000 Nl/kg/h, even more preferably in the range of from 100,000 to 30,000,000 Nl/kg/h. Space velocities in the range of from 500,000 to 10,000,000 Nl/kg/h are particularly suitable for the process of the present invention.

The invention will now be illustrated further by means of the following Example.

EXAMPLE

Catalyst Preparation

Catalyst 1

A ceramic foam (Ce-ZTA; ex Selee) containing 25 pores per cm (65 ppi) was crushed and the 0.17–0.55 mm particles (30–80 mesh fraction) were impregnated with an aqueous solution containing 4.2 wt % Rh (as rhodium trichloride), 4.2 wt % Ir (as iridium tetrachloride), and 11.4 wt % Zr (as zirconia nitrate). The impregnated foam was dried at 140° C. and calcined at 700° C. for 2 hours. The resulting foam comprised 2.5 wt %, Rh, 2.5 wt % Ir and 7.0 wt % Zr.

Catalyst 2

The procedure as used for the preparation of catalyst 1 was repeated, except that the aqueous solution contained 2.8 wt % Rh, 5.3 wt % Ir, and 12.1 wt % Zr, resulting in a foam comprising 1.8 wt % Rh, 3.3 wt % Ir and 7 wt % Zr.

Catalyst 3

The procedure as used for the preparation of catalyst 1 was repeated, except that the aqueous solution contained 8.5 wt % Ir (as iridium tetrachloride) and 11.9 wt % Zr (as zirconia nitrate), resulting in a foam comprising 5.0 wt % Ir and 7.0 wt % Zr.

Catalyst 4

The procedure as used for the preparation of catalyst 1 was repeated, except that the aqueous solution contained 7.9 wt % Rh (as rhodium trichloride) and 10.9 wt % Zr (as zirconia nitrate), resulting in a foam comprising 5.0 wt % Rh and 7.0 wt % Zr.

Catalytic Partial Oxidation

Experiment 1 (according to the invention)

A 6 mm diameter reactor tube was filled with 476 mg of catalyst 1. Nitrogen (720 Nl/h), oxygen (340 Nl/h), and methane (557 Nl/h) were thoroughly mixed and preheated to a temperature of 240° C. The preheated mixture was fed to the reactor at a pressure of 11 bara. The methane conversion was monitored for 170 hours. The results are shown in FIG. 1.

Experiment 2 (according to the invention)

A catalytic partial oxidation process was performed with 476 mg of catalyst 2, under the same condition as described in experiment 1. The methane conversion was monitored for 400 hours. The results are shown in FIG. 1.

Experiment 3 (not according to the invention)

A catalytic partial oxidation process was performed with 447 mg of catalyst 3, under the same condition as described in experiment 1. The methane conversion was monitored for 160 hours. The results are shown in FIG. 1.

Experiment 4 (not according to the invention)

A catalytic partial oxidation process was performed with 452 mg of catalyst 4, under the same condition as described in experiment 1. The methane conversion was monitored for 200 hours. The results are shown in the Figure (enclosed).

The Figure shows the methane conversion versus run time for experiments 1 to 4 (indicated as 1, 2, 3 and 4, respectively. The Y-axis shows the percentage methane conversion, the X-axis shows the hours on stream. It is observed from the Figure that in a catalytic partial oxidation process, a catalyst comprising both rhodium and iridium as catalytically-active metal, shows a higher methane conversion and an improved stability as compared to catalysts comprising either rhodium or iridium.

What is claimed is:

1. A process for the catalytic partial oxidation of a hydrocarbonaceous feedstock, comprising:

contacting a feed comprising the hydrocarbonaceous feedstock and an oxygen-containing gas with a catalyst, comprising rhodium and iridium in intimate association with each other, which catalyst also comprises at least one inorganic metal cation present in intimate association supported on or with the rhodium and iridium, wherein the cation is selected from the group consisting of Al, Mg, Zr, Ti, La, Hf, Si and Ba, wherein the ratio of cation to rhodium and iridium is in excess of or equal to 1.0, and wherein the rhodium and iridium and the cation are supported on a catalyst carrier material.

2. The process of claim 1, in which the catalyst carrier material is a refractory oxide.

3. The process of claim 1, in which the catalyst comprises rhodium and iridium in a ratio (w/w) of from 0.1 to 10.

4. The process of claim 1, in which the hydrocarbonaceous feedstock and the oxygen-containing gas are present in amounts giving an oxygen-to-carbon ratio of from 0.3 to 0.8.

5. The process of claim 1, in which the feed is contacted with the catalyst at a temperature in a range of from 750 to 1400° C.

6. The process of claim 1, in which the feed is contacted with the catalyst at a pressure in the range of from 1 to 150 bara.

7. The process of claim 1, in which the feed is contacted with the catalyst at a gas hourly space velocity in the range of from 20,000 to 10,000,000 Nl/gh/h.

8. The process of claim 1 in which the catalyst comprises rhodium and iridium in a ratio (w/w) of from 0.5 to 2.

9. The process of claim 1 in which the hydrocarbonaceous feedstock and the oxygen-containing gas are present in amounts giving an oxygen-to-carbon ratio of from 0.45 to 0.75.

10. The process of claim 1 in which the feed is contacted with the catalyst at a temperature in a range of from 900 to 1300° C.

11. The process of claim 1 in which the feed is contacted with the catalyst at a pressure in the range of from 5 to 50 bara.

12. The process of claim 1 in which the feed is contacted with the catalyst at a gas hourly space velocity in the range of from 500,000 to 10,000,000 Nl/kg/h.

13. The process of claim 1 in which the catalyst carrier material comprises stabilized or partially-stabilized zirconia.

14. The process of claim 1 in which the hydrocarbonaceous feedstock and an oxygen-containing gas are present in amounts giving an oxygen-carbon ratio of from 0.45 to 0.75; the cation is zirconium; and, the feed is contacted with the catalyst at a temperature in the range of from 900° C. to 1300° C., at a pressure in the range of from 5 bara to 50 bara and at a gas hourly space velocity in the range of from 500,000 Nl/kg/h to 10,000,000 Nl/kg/h.

15. The process of claim 14 in which the catalyst material comprises a stabilized or partially stabilized zirconia.

* * * * *